US010927659B2

(12) United States Patent
San Martin et al.

(10) Patent No.: US 10,927,659 B2
(45) Date of Patent: Feb. 23, 2021

(54) MUD CAKE CORRECTION OF FORMATION MEASUREMENT DATA

(71) Applicant: Halliburton Energy Services, Inc., Houston, TX (US)

(72) Inventors: Luis Emilio San Martin, Houston, TX (US); Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 594 days.

(21) Appl. No.: 15/128,855

(22) PCT Filed: Dec. 11, 2015

(86) PCT No.: PCT/US2015/065273
§ 371 (c)(1),
(2) Date: Sep. 23, 2016

(87) PCT Pub. No.: WO2017/099796
PCT Pub. Date: Jun. 15, 2017

(65) Prior Publication Data
US 2018/0016888 A1 Jan. 18, 2018

(51) Int. Cl.
*E21B 47/08* (2012.01)
*E21B 47/005* (2012.01)
(Continued)

(52) U.S. Cl.
CPC .......... *E21B 47/005* (2020.05); *E21B 21/003* (2013.01); *E21B 47/08* (2013.01);
(Continued)

(58) Field of Classification Search
None
See application file for complete search history.

(56) References Cited

U.S. PATENT DOCUMENTS 3,973,181 A * 8/1976 Calvert .................... G01V 3/24
324/355
4,588,951 A * 5/1986 Ohmer .................. E21B 47/026
324/367
(Continued)

FOREIGN PATENT DOCUMENTS

EP   1662274 A1   5/2006
EP   2110688 A1   10/2009
(Continued)

OTHER PUBLICATIONS

M. Epov, I. Yeltsov, A. Kashevarov, A. Sobolev, and V. Ulyanov, "Time Evolution of the Near Borehole Zone in Sandstone Resrvoir through the Time-Lapse Data of High-Frequency Electromagnetic Logging" pp. 1-10, (Year: 2002).*
(Continued)

*Primary Examiner* — Kibrom K Gebresilassie
(74) *Attorney, Agent, or Firm* — Gilliam IP PLLC

(57) ABSTRACT

In some embodiments, an apparatus and a system, as well as a method and an article, may operate to estimate a value for a mud cake parameter to provide an estimated mud cake parameter value; to generate, in a solution operation, a formation parameter value and an adjusted mud cake parameter value using the estimated mud cake parameter value; and to provide corrected galvanic tool resistivity measurements based on at least the adjusted mud cake parameter value. Additional apparatus, systems, and methods are disclosed.

23 Claims, 6 Drawing Sheets

(51) Int. Cl.
*G01V 3/26* (2006.01)
*G01V 3/38* (2006.01)
*G01V 3/20* (2006.01)
*E21B 47/107* (2012.01)
*E21B 21/00* (2006.01)
*E21B 49/00* (2006.01)
*G01V 13/00* (2006.01)
*E21B 47/18* (2012.01)

(52) U.S. Cl.
CPC ............ *E21B 47/107* (2020.05); *E21B 49/00* (2013.01); *G01V 3/20* (2013.01); *G01V 3/26* (2013.01); *G01V 3/38* (2013.01); *G01V 13/00* (2013.01); *E21B 47/18* (2013.01)

(56) References Cited

U.S. PATENT DOCUMENTS

| | | | | |
|---|---|---|---|---|
| 4,594,552 | A * | 6/1986 | Grimaldi | G01V 11/005 324/375 |
| 4,692,707 | A * | 9/1987 | Locke | G01V 3/24 324/347 |
| 4,765,182 | A * | 8/1988 | Boone | E21B 49/005 175/50 |
| 6,191,588 | B1 * | 2/2001 | Chen | G01V 3/20 324/367 |
| 7,098,664 | B2 | 8/2006 | Bittar | G01V 3/24 324/357 |
| 7,832,503 | B2 * | 11/2010 | Sand | E21B 47/12 175/107 |
| 10,358,911 | B2 * | 7/2019 | Wu | G01V 3/38 |
| 2002/0096363 | A1 | 7/2002 | Evans et al. | |
| 2005/0171699 | A1 * | 8/2005 | Zazovsky | E21B 49/008 702/11 |
| 2007/0035305 | A1 * | 2/2007 | Itskovich | G01V 3/24 324/355 |
| 2007/0083330 | A1 * | 4/2007 | Frenkel | G01V 3/20 702/7 |
| 2008/0023628 | A1 * | 1/2008 | Desport | G01V 5/125 250/256 |
| 2008/0238427 | A1 * | 10/2008 | Clark | G01V 3/20 324/347 |
| 2008/0306692 | A1 * | 12/2008 | Singer | G01V 11/007 702/11 |
| 2009/0143991 | A1 * | 6/2009 | Flaum | E21B 47/06 702/12 |
| 2010/0019771 | A1 | 1/2010 | Gold et al. | |
| 2010/0039115 | A1 | 2/2010 | Bespalov et al. | |
| 2011/0266056 | A1 * | 11/2011 | Pop | E21B 49/08 175/50 |
| 2012/0170405 | A1 * | 7/2012 | Zharnikov | G01V 1/50 367/27 |
| 2014/0233354 | A1 * | 8/2014 | Zharnikov | E21B 49/00 367/86 |
| 2014/0306711 | A1 | 10/2014 | Hu | |
| 2015/0039275 | A1 * | 2/2015 | Mikhailov | G06F 17/5009 703/2 |
| 2015/0292323 | A1 * | 10/2015 | Shahri | E21B 49/006 702/9 |
| 2018/0016888 | A1 * | 1/2018 | San Martin | G01V 3/26 |
| 2018/0017701 | A1 * | 1/2018 | San Martin | G01V 3/18 |

FOREIGN PATENT DOCUMENTS

| | | |
|---|---|---|
| GB | 1520295 A | 8/1978 |
| WO | WO-2009039468 A1 | 3/2009 |
| WO | WO-2012033684 A2 | 3/2012 |
| WO | 2017111938 A1 | 6/2017 |

OTHER PUBLICATIONS

J. Craig Tingey, "Connprenensive Analysis of Russian Petrophysical Measurnnents" pp. 1-12, (Year: 1995).*

"International Application Serial No. PCT/US2015/065273, International Search Report dated Sep. 7, 2016", 3 pgs.

"International Application Serial No. PCT/US2015/065273, Written Opinion dated Sep. 7, 2016", 13 pgs.

Torres-Verdín, Carlos, "Petrophysical inversion of borehole array-induction logs: Part II—Field data examples", Geophysics, 71(5), (2006), G261-G268.

Chemali, et al., "The Dual Laterolog in Common Complex Situations", Society of Petrophysicists and Well-Log Analysts, SPWLA 29th Annual Logging Symposium, Jun. 5-8, 1988, San Antonio, Texas, 25 pages.

Griffiths, et al., "Better Saturation from New Array Laterolog", SPWLA 40th Annual Logging Symposium, May 30-Jun. 3, 1999, Oslo, Norway, 1-14.

Hezhu, et al., "A Practical 2D Dual Laterolog (DLL) Inversion Method and Its Impacts on HPV Estimation", Society of Exploration Geophysicists, SEG Annual Meeting, Sep. 9-14, 2001, San Antonio, Texas, 4 pages.

Suau, et al., "The Dual Laterolog-Rxo Tool", Fall Meeting of the Society of Petroleum Engineers of AIME, Oct. 8-11, 1972, San Antonio, Texas, 44 pages.

* cited by examiner

MUD CAKE CORRECTION OF FORMATION MEASUREMENT DATA

PRIORITY APPLICATIONS

This application is a U.S. National Stage Filing under 35 U.S.C. § 371 from International Application No. PCT/US2015/065273, filed on Dec. 11, 2015, which application is incorporated herein by reference in its entirety.

BACKGROUND

Understanding the structure and properties of geological formations is important for a wide variety of functions in well and reservoir management, monitoring, and remediation. Measurement devices, such as galvanic tools, can make measurements in a borehole or formation downhole measurements) to provide data to aid in attaining this understanding.

Galvanic tools inject current into downhole formations to evaluate formation resistivity, Galvanic tools are appropriately used for resistivity measurement in boreholes filled with water-based mud (WBM). However, mud cake can form on the borehole wall of boreholes filled with WBM, and it can affect the accuracy of galvanic tool measurements.

DETAILED DESCRIPTION

The following detailed description refers to the accompanying drawings that depict various details of examples selected to show how particular embodiments may be implemented. The discussion herein addresses various examples of embodiments at least partially in reference to these drawings and describes the depicted embodiments in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

Figure 1:
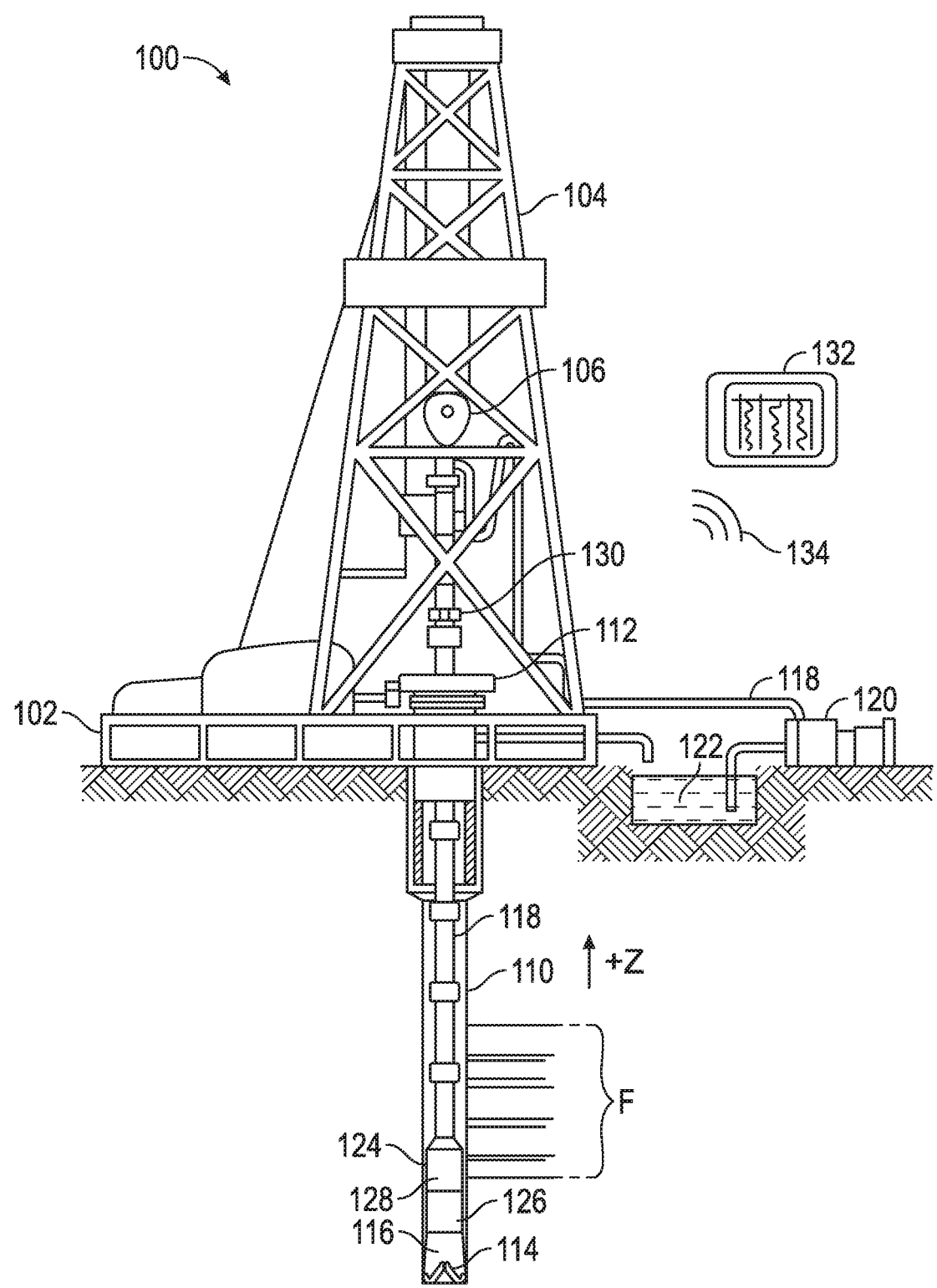
FIG. 1 illustrates an example logging while drilling (LWD) or measuring while drilling (MWD) system in which some embodiments can be implemented.

The tools and methods disclosed herein are best understood in the context of the larger systems in which they operate. Accordingly, FIG. 1 illustrates an example logging while drilling (LWD) or measuring while drilling system 100. A drilling rig or platform 102 supports a derrick 104 or other supporting structure, such as including or coupled to a hoist 106. The hoist 106 is used for raising or lowering equipment or other apparatus such as drill string 108. The drill string 108 accesses a borehole 110, also known as a wellbore, such as through a wellhead 112. The borehole 110 may be drilled in any direction, for example, vertical, inclined, horizontal, and combinations thereof.

The lower end of the drill string 108 includes various apparatus, such as a drill bit 114, to provide the borehole 110. A downhole motor assembly 116 rotates the drill bit 114. As the drill bit 114 rotates, it extends the borehole 110 that passes through various subsurface formations F. The downhole motor assembly 116 may include a rotary steerable system (RSS) that enables the drilling crew to steer the borehole 110 along a desired path.

Drilling fluid or "mud" circulates in the annular region around the drill bit 114 or elsewhere, such as provided to the borehole 110 through a supply pipe 118, circulated by a pump 120, and returning to the surface to be captured in a retention pit 122 or sump. The drilling fluid transports cuttings from the borehole into the retention pit 122 and aids in maintaining the borehole integrity.

The drill bit 114 and downhole motor assembly 116 form a portion of a bottom hole assembly (BHA) 124 that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. Some of these drill collars include calipers (e.g., acoustic calipers) for measuring the diameter or area of the borehole.

Various subs or tool assemblies may also be located along the drill string 108 and/or in the BHA 124. As the BHA 124 passes through various regions of the formation F, information may be obtained. For example, the BHA 124 may include a borehole imaging tool 126 that collects measurements relating to various formation properties as well as the tool orientation and/or other drilling conditions. As the drill bit 114 extends the borehole 110 through the subsurface formations F, the borehole imaging tool 126 collects measurements for use in determining an apparent formation F resistivity.

A telemetry sub 128 is included in the BHA 124 to provide a communications link with the surface. The telemetry sub 128 includes wireless telemetry or logging capabilities, or both, such as to transmit or later provide information indicative of a formation resistivity to operators on the surface or for later access in evaluation of formation F properties. Mud pulse telemetry is one common telemetry technique for transferring tool measurements to a surface interface 130 and to receive commands from the surface interface 130, but other telemetry techniques can also be used. For example, the surface interface 130 includes one or more of wireless telemetry, processor circuitry, or memory facilities, such as to support log-while-drilling (LWD) or measurement-while-drilling (MWD) operations.

A surface processor, shown in FIG. 1 in the form of a computer 132, communicates with surface interface 130 via a wired or wireless network communications link 134, and provides a graphical user interface (GUI) or other form of interface that enables a user to provide commands and to receive and optionally interact with a visual representation of the acquired measurements.

The surface processor can take alternative forms, including a desktop computer, a laptop computer, an embedded processor, a cloud computer, a central processing center accessible via the Internet, and any combination of the foregoing.

Figure 2:
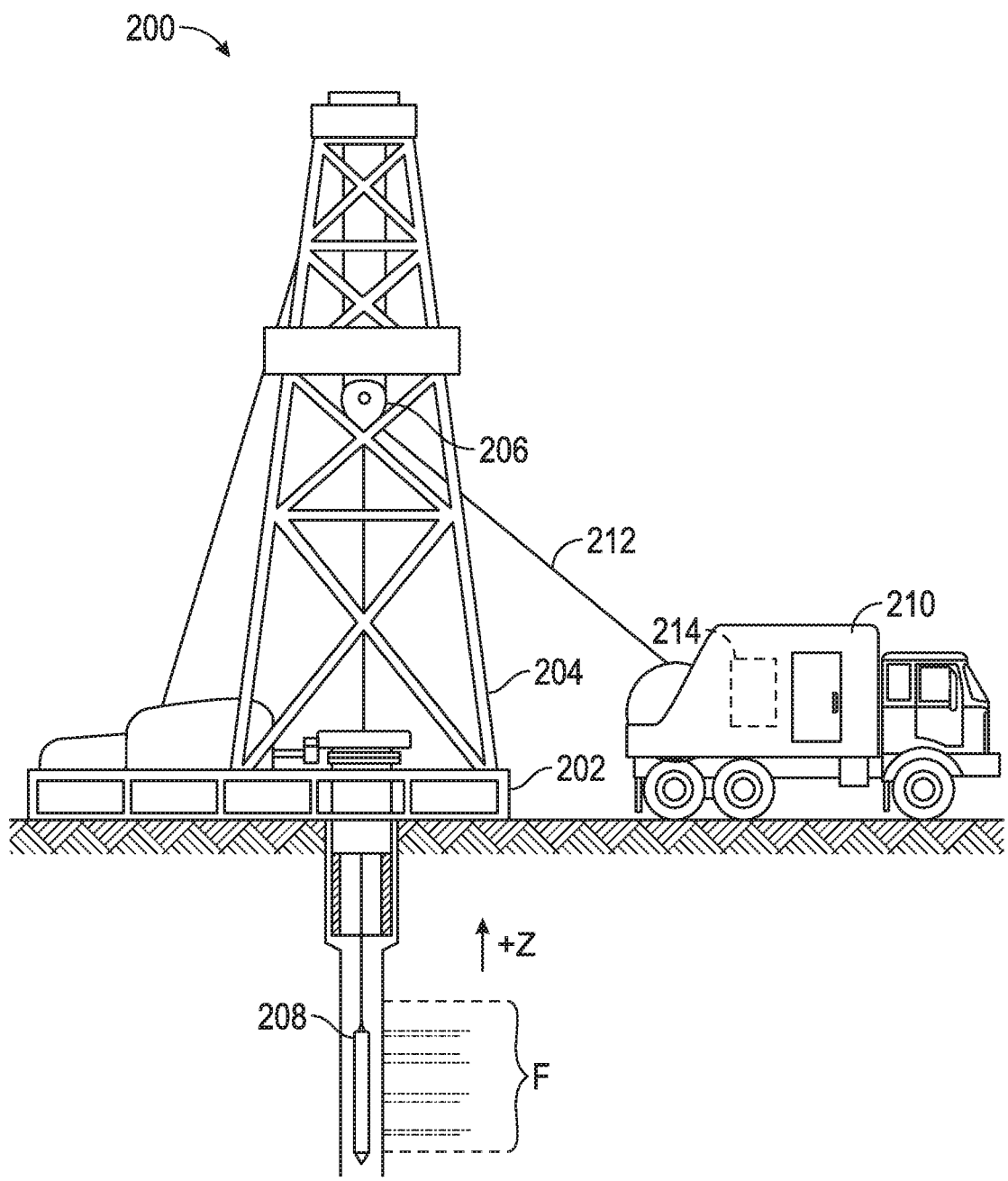
FIG. 2 illustrates an example wireline system in which some embodiments can be implemented.

At various times during the drilling process, the drill string 108 may be removed from the borehole, allowing wireline logging operations to be conducted in a wireline logging system 200 as shown in FIG. 2. A platform 202, such as coupled to a derrick 204, includes a hoist 206 that is used to raise or lower equipment such as a wireline logging tool 208, such as a wireline sonde, into or out of a borehole. In this wireline example, a logging facility 210 (e.g., logging truck) suspends the wireline logging tool 208 on a wireline cable 212 providing a communicative coupling between the wireline logging tool 208 and the logging facility 210.

Measurements from the formation F may be obtained, such as using a galvanic tool included as at least a portion of the wireline logging tool 208. The galvanic tool may comprise, for example, an array laterolog. The measurements include resistivity measurements of the formation F. The wireline cable 212 includes conductors for transporting power to the tool and telemetry from the tool to the surface, where the logging facility 210 includes a processor 214 (e.g., a computer or other storage or control circuitry) that acquires and stores measurement data from the wireline logging tool 208. The wireline logging tool 208 may have pads and/or centralizing springs to maintain the tool near the axis of the borehole as the tool traverses the borehole.

The borehole imaging tool 126 or the wireline logging tool 208 collects formation impedance measurements (e.g., resistivity, conductivity, reactance, or complex impedance) that are associated with distance Z along the borehole and at an azimuthal angle around the borehole 110 to provide a borehole wall image.

For purposes of illustration, the examples of FIGS. 1 and 2 show a vertically-oriented borehole configuration. However, the apparatus and techniques described herein may also be used in other borehole configurations, such as a borehole including a horizontal penetration direction, or an oblique borehole configuration, for example. The examples of FIGS. 1 and 2 also generally illustrate land-based examples. Alternatively, the apparatus and techniques described herein may be used in offshore environments as well, such as for subsea operations. In particular, offshore or subsea operations may include use of wireline or LWD/MWD apparatus and techniques including aspects of the examples herein.

Figure 3:
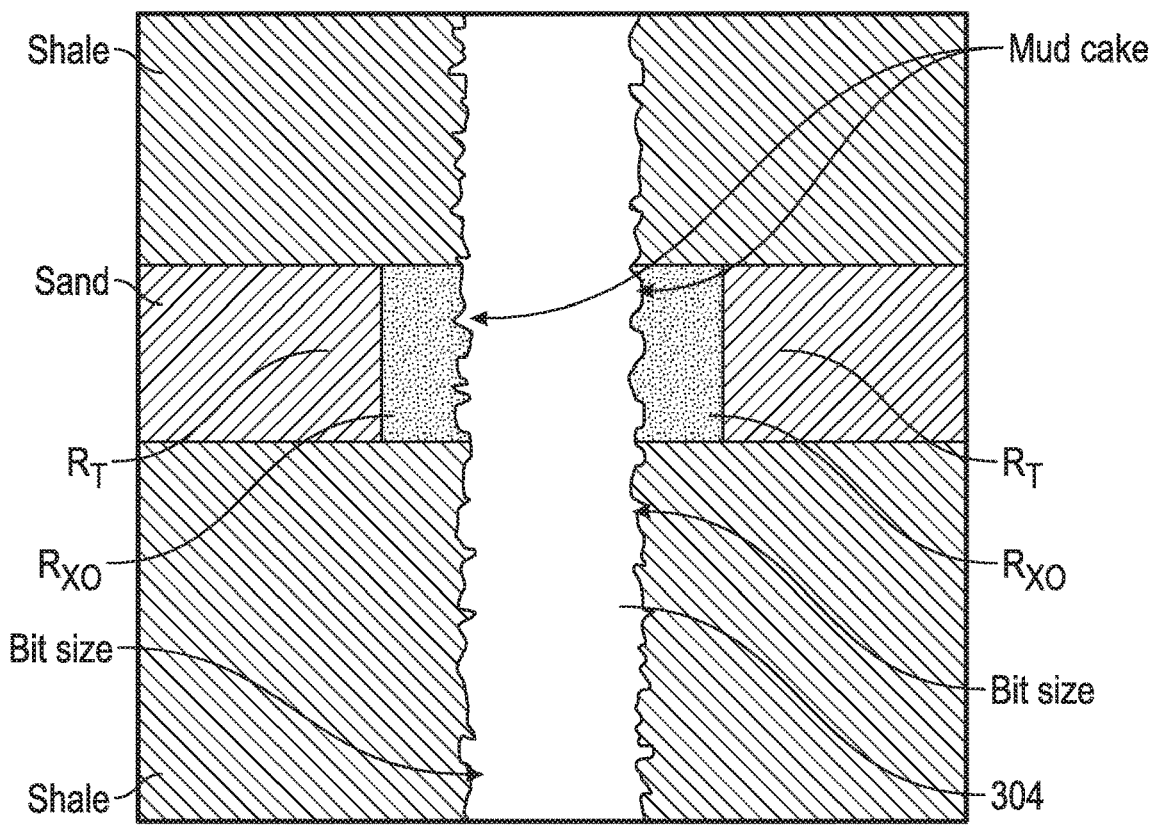
FIG. 3 is a cross-sectional view of a borehole within a formation having at least two zones for the purposes of illustrating some embodiments.

Referring to FIG. 3, in a formation 300, galvanic tool measurements can experience a mud cake effect, which is caused by the presence of mud cake on the borehole wall. Galvanic tools are most appropriate for water based mud (WBM) filled boreholes, because the low resistivity of the mud produces relatively small borehole effect.

In permeable formations, because of differential pressure between the borehole 304 and the formation, the borehole 304 is generally at a higher pressure than the fluid in the formation, and this differential pressure causes the mud to invade the formation until pores of the formation are sealed by the solids in the mud. Once the formation pores have been sealed, the flow of mud into the formation stops and any additional mud will accumulate on the surface as a mud cake in the permeable formation zones, causing variations in resistivity measurements. For example, in permeable formation zones, the formation displays an invasion resistivity profile in which formation resistivity varies from the mud cake resistivity to the invasion zone resistivity and to the non-invaded formation resistivity, as shown in FIG. 3. In illustrative simplified schematic model of FIG. 3, the permeable zone contains a borehole fluid invaded region with resistivity $R_{xo}$ and a non-invaded region with resistivity $R_T$.

The bit size is also indicated to describe a situation in which the mud cake presence reduces the borehole size below the original bit size. Porous sections or permeable sections of the formation will have a diameter smaller than the diameter with which the borehole 304 was originally drilled, or smaller than the original bit size.

Figure 4:
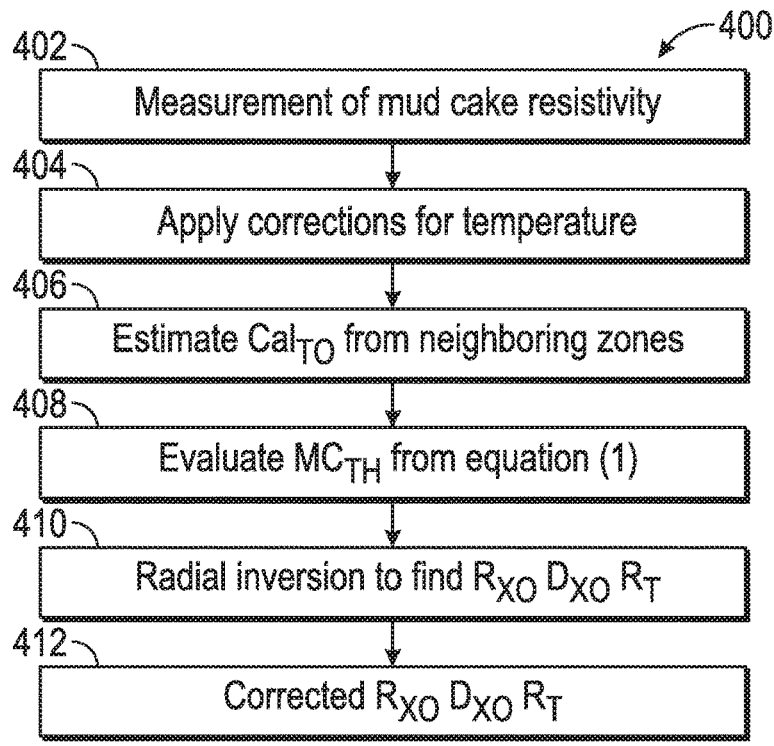
FIG. 4 is a flowchart illustrating a method for mud cake correction in accordance with some embodiments.

The presence of mud cake, and the reduced borehole size near permeable zones of the formation, can change resistivity measurements, thereby affecting accuracy of measurements of formation resistivity taken with galvanic tools. Embodiments therefore adjust logs taken with galvanic tools based on the presence of mud cake. FIG. 4 is a flowchart illustrating a method 400 for mud cake correction in accordance with some embodiments. Method 400, and other example methods for mud cake correction, can be applied at a well site or at processing center after logging. For example, any or all of the methods described herein can be performed at a surface processor such as the computer 132 (FIG. 1) or at a logging facility 210 (FIG. 2).

Method 400 begins with operation 402 when the computer 132 or logging facility 210 estimates a value for a mud cake parameter to provide an estimated mud cake parameter value for further operations. In embodiments, the mud cake parameter includes mud cake resistivity. In at least some situations and operations, mud, mud-filtrate and mud-cake resistivities are measured at logging time. The relation between mud resistivity and mud cake resistivity is tabulated for standard conditions for use in adjusting resistivity measurements and other measurements based on mud cake. However, sometimes when the borehole fluid has been replaced, the standard relation may not apply and the mud cake resistivity could be significantly different from the mud resistivity. This variation, and the presence of mud cake itself, can affect the accuracy of galvanic tool measurements. Embodiments as described herein provide inversion-based methods, rather than tabulation-based methods, for correcting for the effect of mud cake.

The method 400 can also include applying corrections for temperature to the measurements or estimates of mud cake resistivity or other mud cake parameters in operation 404. Because resistivity varies with temperature, and downhole temperatures are typically higher than surface temperatures, corrections for temperature are applied to adjust resistivities for materials such as mud to what would be expected to be the actual resistivity of those materials downhole.

The method 400 involves an estimation of the mud cake thickness $MC_{TH}$, which can be obtained as described in more detail below (with respect to operations 406 and 408) from the caliper and the drill bit 114 size and from an estimate of the average rugosity. Rugosity is a qualitative description of the roughness of the borehole 110 wall. Rugosity can refer to changes at the scale or below the scale of logging measurements, and is typically in a range from approximately an inch to a foot. Rugosity can affect logging tool (e.g., galvanic tool) responses. Rugosity includes changes on the surface wall that are not captured by caliper logging because they are below the scale that the caliper can measure. Rugosity can be estimated by the effect it has on measurements of the tools. In most situations and conditions, well diameter is larger than the drill bit 114 size due to the lateral movement of the drill bit 114 within the borehole and the rugosity created by the drilling. In the absence of mud cake, the borehole 110 diameter can be estimated to be approximately equal to the local caliper reading plus an estimated rugosity from radial inversion results.

In permeable sands, the accumulation of mud cake on the borehole 110 wall can be significant to the point of producing caliper readings that are smaller than the drill bit 114 size. A system, such as the computer 132 or logging facility 210, etc., can identify zones that are affected by the presence of mud cake by searching for a step-like reduction in the caliper readings with borehole 110 diameter averages significantly different to surrounding zones. Once the computer 132 or logging facility 210 has identified zones affected by mud cake, in some embodiments, the computer 132 or logging facility 210 will estimate $MC_{TH}$ for use in determining the numerical effect that mud cake will have on resistivity measurements or other galvanic tool measurements.

Accordingly, method 400 continues with operation 406 in which the computer 132 or logging facility 210 estimates the borehole diameter at drilling time, before mud cake deposition ($Cal_{T0}$). The thickness of the mud cake layer can be estimated by first assuming that the average borehole 110 diameter prior to the deposition of mud cake is approximately equal to the caliper readings in the neighboring areas. In embodiments, the computer 132 or logging facility 210, or other processor or system associated with the calipers, galvanic tool, or other measurement device, will revise the estimates of mud cake thickness during inversion or another solution operation. Revised estimates of mud cake thickness can then be used to provide corrected borehole diameter measurements.

The method 400 continues with operation 408 in which the computer 132, logging facility 210, or other system or computer estimates $MC_{TH}$ based on the estimated borehole diameter $Cal_{T0}$ before mud cake deposition and on a measured borehole diameter that has been measured after mud cake deposition. Once the computer 132 or logging facility estimates borehole 110 diameter $Cal_{T0}$ before mud cake deposition, the computer 132 or logging facility 210 derives thickness of the mud cake according to:

$$MC_{TH} = (Cal_{T0} - Cal)/2 \quad (1)$$

where $MC_{TH}$ is mud cake thickness, $Cal_{T0}$ is the estimated borehole diameter before mud cake deposition, where the sub-index indicates the caliper at drilling time, and Cal is the measured borehole diameter. Here it is assumed that the caliper measures the borehole 110 diameter. $MC_{TH}$ on either side of the borehole 110 is obtained by dividing the difference between $Cal_{T0}$ and Cal by two. In embodiments, the results of Equation (1) can be used as a constraint for constraining further estimates and updates to $MC_{TH}$ as generated in further operations.

In some embodiments, after $MC_{TH}$ has been estimated, the computer 132, logging facility 210, or other processor or system associated with the galvanic tool or other tool can use the $MC_{TH}$ estimate as an input to perform a solution operation, such as, e.g., a radial inversion.

Accordingly, the method 400 continues with operation 410 with generating formation parameter values and adjusted mud cake parameter values using the estimated mud cake parameter value, wherein the formation parameter can include the resistivity of the invasion $R_{xo}$, the diameter $D_{xo}$ of the invasion, resistivity $R_T$ of non-invaded portions of the formation, or any other parameter that operators can use to increase or enhance understanding of subterranean formations.

In embodiments, the solution operation will solve for, generate, or calculate estimates or values for the resistivity of the invasion $R_{xo}$ diameter $D_{xo}$ of the invasion and resistivity $R_T$ of non-invaded portions of the formation. In some embodiments, initial measurements or estimates can be provided for $R_T$ or other parameters by LWD measurements or other measurements before mud cake formation, or from induction type measurements that are not affected, or which are minimally affected, by the presence of mud cake. These initial measurements or estimates can be provided to enhance computation speed or accuracy of the solution operation by improving the initial estimate of an iterative inversion scheme. Some operators will have available, or will capture, simultaneous logs on the same run based on both induction tool and laterolog tool measurements, and these logs and tools can accordingly provide complementary information that can be used to resolve uncertainties that can result during the initial estimation of the resistivity values. Once the inversion is set up with the described initial conditions, the thickness of the mud cake $MC_{TH}$ can be modified to achieve better fit to measurement data or based on other criteria, or $MC_{TH}$ can be constrained based on a value, such as a value generated in Equation (1). In some embodiments, other formation parameter values, mud cake values, etc., can be constrained within a range of measured or estimated values.

The example method 400 continues with operation 412 with generating corrected formation measurements for the formation using at least the adjusted mud cake parameter value. As described earlier herein, these formation measurements can include measurements of values for $R_{xo}$, $D_{xo}$, and $R_T$ that have been corrected to adjust for the presence of mud cake, although embodiments are not limited to any particular measurements or parameters. Using corrected formation measurements, a controller 725 (FIG. 7) or other system as described later herein with reference to FIG. 7 can control a drilling operation based on the corrected measurements generated according to algorithms or processes described herein.

Figure 5:
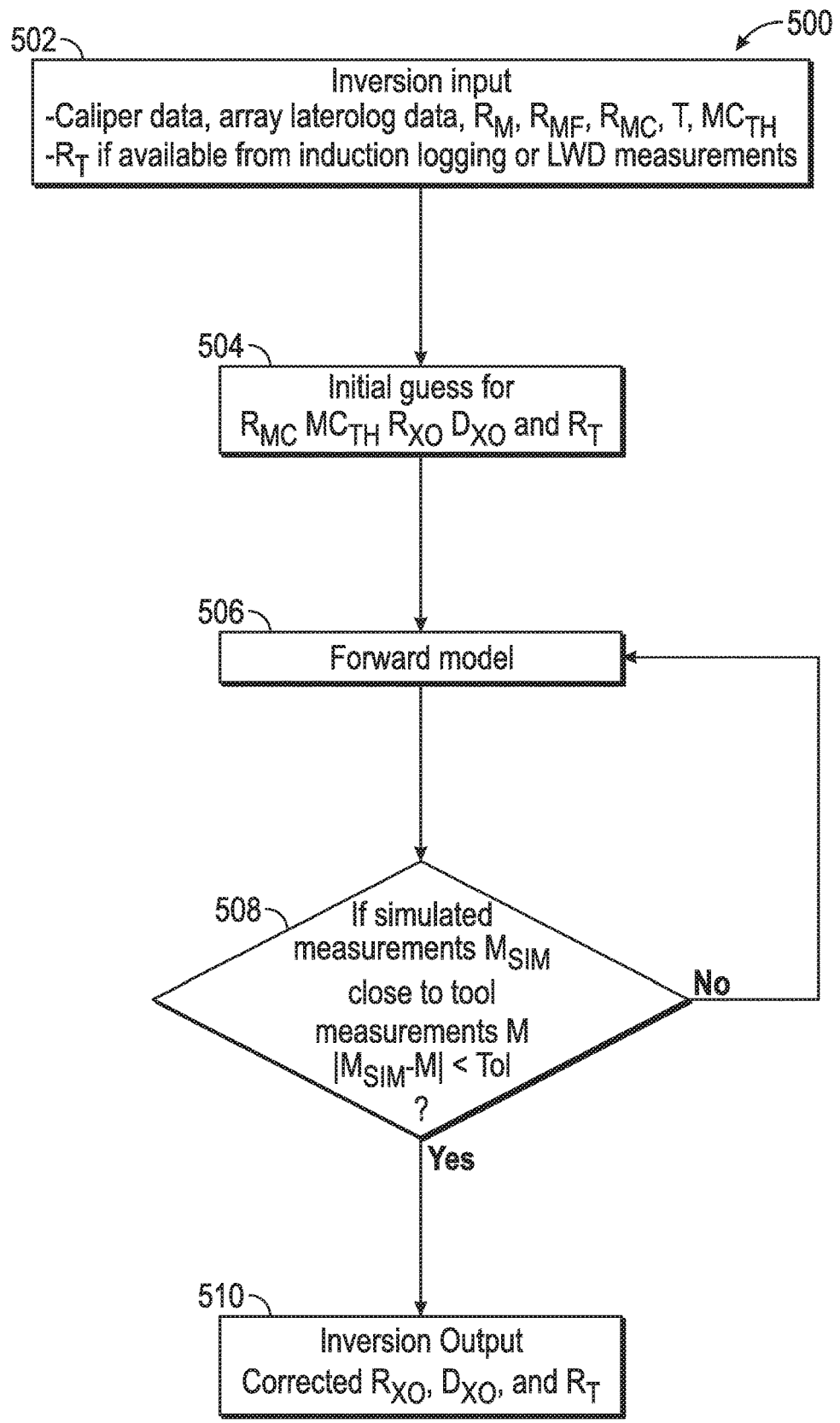
FIG. 5 is a flow chart illustrating radial inversion applied to recover corrected formation parameter values in accordance with some embodiments.

Additional details concerning the inversion operation 410 are given with reference to FIG. 5. FIG. 5 is a flow chart illustrating radial inversion 500 applied to recover corrected formation parameter values in accordance with some embodiments.

At 502, temperature gauges, logging tools, or other tools or systems provide input data to the computer 132 or logging facility 210 in the form of voltages and currents to be processed into apparent resistivities, which are obtained by scaling voltage and current measurements with a tool constant assuming a homogeneous formation. Input data can include all or some of temperature T, mud resistivity $R_M$, mud cake resistivity $R_{MC}$, and mud cake thickness $MC_{TH}$, as well as estimates from logging data of resistivity $R_T$ of non-invaded portions, diameter $D_{xo}$) of the invasion, etc., as described above with respect to operation 410 (FIG. 4). From this information the computer 132 or logging facility 210 generates initial estimates for the variables $R_{MC}$, Rxo, $R_T$, $MC_{TH}$ and $D_{xo}$ at 504.

After the computer 132 or logging facility 210 generates initial estimates, the computer 132 or logging facility 210 performs iterative inversion at 506 to iteratively update estimates of values for Rxo, $R_T$, and $D_{xo}$ using forward modeling. When estimates or updates for values of Rxo, $R_T$ and $D_{xo}$ used in the forward model generate simulated tool logs that match measured logs captured with the galvanic tool (e.g., laterolog tool or array laterolog tool), based on a criterion or criteria determined at operation 508, the computer 132 or logging facility 210 terminates operations with the inversion outputs 510 being used as the corrected values for Rxo, $D_{xo}$, and $R_T$. The criteria for determining when to terminate inversion operations can include determining whether estimates of logs fall within a tolerance compared with measured logs (e.g., within a range of about 1%). The iterative inversion or other solution operation can also provide updates for $R_{MC}$ and $MC_{TH}$ in some embodiments. As described earlier herein, constraint values can be applied to any of Rxo, $R_T$, $D_{xo}$, $R_{MC}$ and $MC_{TH}$, etc.

The effect of mud cake on the measurements of the laterolog tools or other galvanic tools is dependent not on the independent values of $R_{MC}$ and $MC_{TH}$ but on the combined product of the quantities $(R_{MC}) \times (MC_{TH})$, e.g., an effective mud cake resistance. This is because a thin (i.e., $MC_{TH}$ relatively small, or on the order of several inches) mud cake with high resistivity $R_{MC}$ can produce the same voltage drop with a thick (i.e., $MC_{TH}$ is relatively large, i.e., on the order of two or more feet) mud cake with low resistivity $R_{MC}$. The impedance Z generated by a mud cake with resistivity $R_{MC}$ and thickness $MC_{TH}$ between the borehole 110 and invaded zone (where resistivity=Rxo in FIG. 3) affects the resistivity measurements of galvanic tools, and this impedance Z is proportional to the product of mud cake resistivity $R_{MC}$ and thickness $MC_{TH}$.

Figure 6:
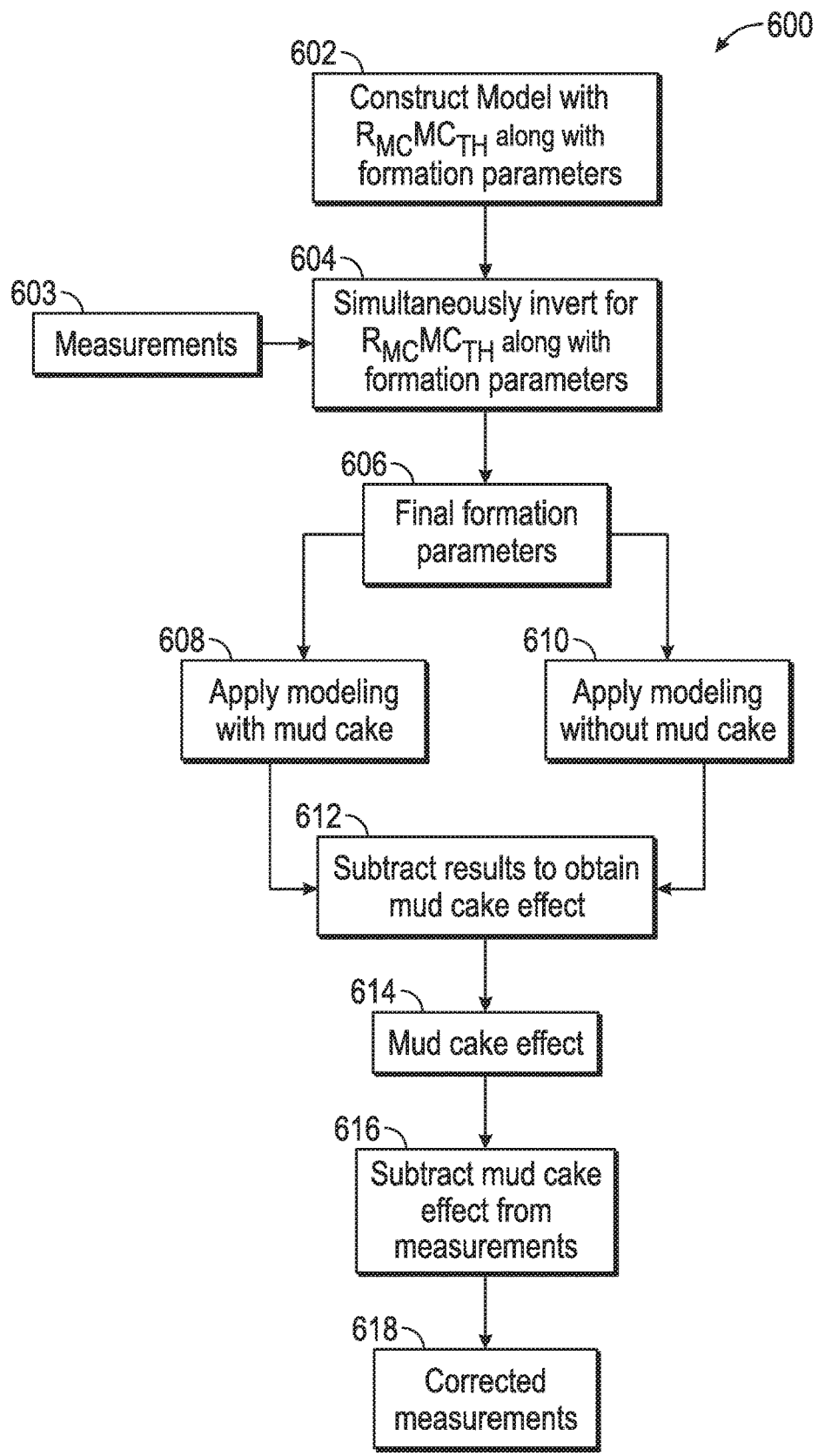
FIG. 6 is a flow chart illustrating a method for obtaining and adjusting for the effect of mud cake in accordance with some embodiments.

More details on the inversion and removal of effects caused by presence of mud cake are given in FIG. 6. FIG. 6 is a flow chart illustrating a method 600 for obtaining and adjusting for the effect of mud cake in accordance with some embodiments. In operation 602, the computer 132, logging facility 210, or other processor, computer, electrical device, or system will generate a formation model using values for $R_{MC}$, $MC_{TH}$, and other formation parameters. In operation 604, the computer 132, logging facility 210, etc. will invert for $R_{MC}$, $MC_{TH}$, and other formation parameters using measurements provided or generated by estimates or by galvanic tools, induction tools, or other measurement devices to generate formation parameters 606. Formation parameters can include resistivities for one or several layers of a formation.

In operations 608 and 610, the computer 132 or logging facility 210 or other processor or system applies modeling with or without mud cake, respectively. For example, the computer 132 or logging facility 210 can model the formation twice, first using a hypothetical mud cake of a mud cake thickness and mud cake resistivity as determined using algorithms described earlier herein with reference to FIGS. 3-5.

In operation 612, the computer 132 or logging facility 210 subtracts the models generated in operations 608 and 610 to determine the magnitude of the effect of mud cake. In operation 618, the computer 132 or logging facility 210 corrects measurements of various parameters including at least borehole fluid invaded region with resistivity $R_{xo}$ of the borehole 110 fluid invaded region, resistivity $R_T$ of the non-invaded region, and if necessary other parameters.

By implementing the above methods, operators can improve accuracy of array laterolog results delivered to the customer. Methods in accordance with various embodiments can improve accuracy in characterization of the formation resistivity of the array laterolog leading to improved economic outcomes for oil and gas exploration and production companies. Methods in accordance with various embodiments can improve accuracy of results in the presence of rugosity and mud cake, thereby providing a more accurate representation of the formation resistivity at depths corresponding to areas of greater mud cake deposition.

Figure 7:
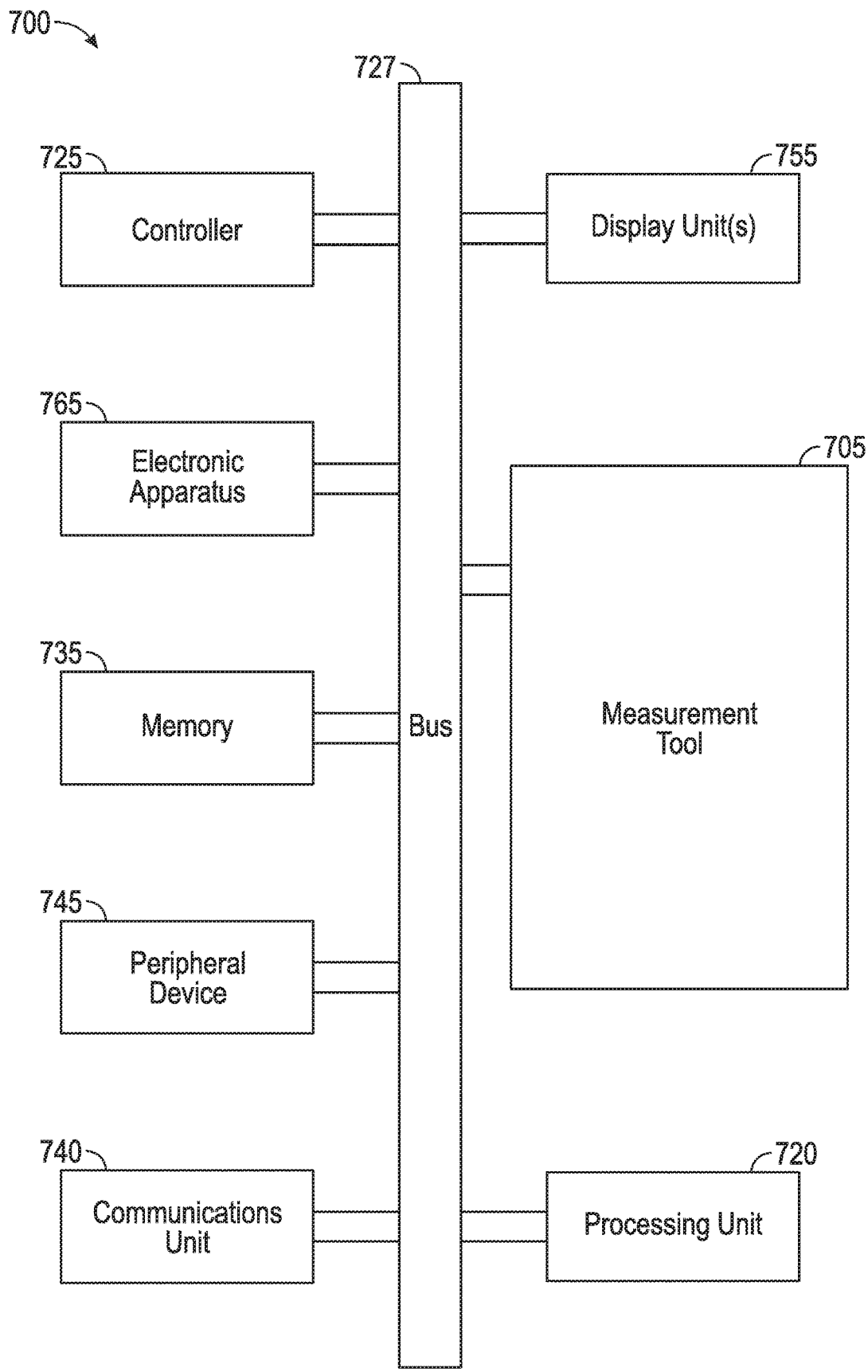
FIG. 7 depicts a block diagram of features of a logging system, according to various embodiments.

FIG. 7 depicts a block diagram of features of an example system 700 having a processing unit and a tool to operatively evaluate mud effects in laterolog tool measurements. System 700 includes a processing unit 720 communicatively coupled to one or more measurement tools 705, such as a galvanic tool or laterolog-type tool as described herein. The processing unit 720 can be included in, or can include some components of, the computer 132 or logging facility 210 described earlier herein. Accordingly, the processing unit 720 can perform some or all of the functionalities described above with reference to FIGS. 4-6.

The system 700 can also include a controller 725, a memory 735, an electronic apparatus 765, and a communications unit 740, Controller 725, memory 735, and communications unit 740 can be arranged to control operation of the measurement tools 705 in a manner similar or identical to a processing unit 720 discussed herein. Various components of system 700 can operate together as a processing unit to provide control and processing for the LWD tool to process, correlate, associate, model, and evaluate a plurality of measurements from one or more measurement tools 705. The controller 725, memory 735, and electronic apparatus 765 can be realized to activate the measurement tools 705 in accordance with measurement procedures and signal processing as described herein. Communications unit 740 can include downhole communications in a drilling operation. Such downhole communications can include a telemetry system.

The system 700 can also include a bus 727, where bus 727 provides electrical conductivity among the components of system 700. Bus 727 can include an address bus, a data bus, and a control bus, each independently configured. The bus 727 can also use common conductive lines for providing one or more of address, data, or control, the use of which can be regulated by controller 725. Bus 727 can be configured such that the components of system 700 are distributed. Such distribution can be arranged between downhole components such as transmitters and receivers of LWD tools and components, including components of measurement tools 705, can be disposed on the surface. Alternatively, the components can be co-located such as on one or more collars of a drill string or on a wireline structure.

In various embodiments, peripheral devices 745 can include displays, additional storage memory, and/or other control devices that may operate in conjunction with controller 725 and/or memory 735. In an embodiment, controller 725 is a processor. Peripheral devices 745 can be arranged with a display and can be used with instructions stored in memory 735 to implement a user interface to manage the operation of the measurement tools 705 and/or components distributed within system 700. The processing unit 720 or memory 735 can therefore provide data representative of mud cake, or other formation features, for publication to the display. Such a user interface can be operated in conjunction with communications unit 740 and bus 727. Various components of system 700 can be integrated with LWD tools such that processing identical to or similar to the processing schemes discussed with respect to various embodiments herein can be performed downhole in the vicinity of the measurement.

The phrase "processor-readable medium" shall be taken to include any tangible non-transitory device which is capable of storing or encoding a sequence of instructions for execution by the machine and that causes the machine to perform any one of the described and/or claimed methodologies. One or more processors such as, for example, the processing unit 720, can operate on the physical structure of such instructions. Executing these physical structures can cause the machine to perform operations to estimate a value for a mud cake parameter to provide an estimated mud cake parameter value; to use a radial inversion operation to generate a formation parameter value and an adjusted mud cake parameter value using the estimated mud cake parameter value; and to generate corrected measurements using at least the adjusted mud cake parameter value.

The instructions can include instructions to cause the processing unit 720 to perform any of, or a portion of, the above-described operations in parallel with performance of any other portion of the above-described operations. The processing unit 720 can store, in memory 735, any or all of the data received from the measurement tools 705.

A processor-readable medium includes a machine-readable medium or computer readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

Various examples include:

Example 1 is a method for mud cake correction, the method comprising: estimating a value for a mud cake parameter to provide an estimated mud cake parameter value; generating, in a solution operation, a formation parameter value and an adjusted mud cake parameter value using the estimated mud cake parameter value; and providing corrected resistivity measurements for a formation based on at least the adjusted mud cake parameter value.

In Example 2, the subject matter of Example 1 further includes wherein the mud cake parameter includes mud cake thickness, and wherein the method further comprises: estimating mud cake thickness based on an estimated borehole diameter before mud cake deposition and on a measured borehole diameter that has been measured after mud cake deposition, to generate a mud cake thickness estimate; and providing the mud cake thickness estimate as an input to the solution operation.

In Example 3, the subject matter of Example 2 further includes wherein the mud cake parameter includes mud cake resistivity, and wherein the method further comprises: generating a revised mud cake thickness during the solution operation; and providing corrected borehole diameter measurements using at least the revised mud cake thickness.

In Example 4, the subject matter of Example 3 further comprises providing an estimated mud cake resistivity comprises measuring mud cake resistivity.

In Example 5, the subject matter of Example 4 further comprises correcting the estimated mud cake resistivity based on a surface temperature measurement before mud cake deposition.

In Example 6, the subject matter of Examples 3-5 further comprises generating an effective mud cake resistance that is proportional to a product of the mud cake thickness estimate and an adjusted mud cake resistivity; and correcting resistivity tool measurements using the effective mud cake resistance.

In Example 7, the subject matter of Examples 1-6 further includes wherein the solution operation includes an inversion operation.

In Example 8, the subject matter of Examples 1-7 further includes controlling a drilling operation based on the corrected resistivity measurements.

In Example 9, the subject matter of Examples 1-8 further includes providing data representative of the mud cake thickness estimate for publication to a user display.

Example 10 is a logging system comprising: a measurement tool configured to provide measurements of a formation parameter; and a processing unit coupled to the measurement tool and configured to estimate a value for a mud cake parameter to provide an estimated mud cake parameter value; generate, in a radial inversion operation using the estimated value for the mud cake parameter, a formation parameter value and an adjusted mud cake parameter value; and provide corrected resistivity measurements and corrected borehole diameter measurements using the adjusted value for the mud cake parameter.

In Example 11, the subject matter of Example 10 further includes wherein the measurement tool is galvanic.

In Example 12, the subject matter of Examples 10-11 further includes wherein the measurement tool includes a laterolog.

In Example 13, the subject matter of Examples 10-12 further includes a caliper system for measurement of a borehole diameter.

In Example 14, the subject matter of Examples 10-13 further includes a user display configured to display data representative of the mud cake.

Example 15 is a processor-readable medium including instructions that, when executed on a processor, cause the processor to perform operations including: estimating a value for a mud cake parameter to provide an estimated mud cake parameter value; generating, in a radial inversion operation, a formation parameter value and an adjusted mud cake parameter value based on the estimated mud cake parameter value; and generating corrected measurements using at least the adjusted mud cake parameter value.

In Example 16, the subject matter of Example 15 further includes estimating mud cake thickness based on an estimated borehole diameter before mud cake deposition and on a measured borehole diameter that has been measured after mud cake deposition, to generate a mud cake thickness estimate; and providing the mud cake thickness estimate as an input to the radial inversion operation.

In Example 17, the subject matter of Examples 15-16 further includes applying a first model to a formation, the first model including a mud cake region having a mud cake thickness and a mud cake resistivity, to generate a first solution for the formation; applying a second model to the formation, the second model not including the mud cake region, to generate a second solution for the formation; and comparing the first solution and the second solution to generate an effective mud cake resistance value, and adjusting resistivity tool measurements based on the effective mud cake resistance value.

In Example 18, the subject matter of Examples 15-17 further includes wherein effective mud cake resistance R is equal to mud cake resistivity times mud cake thickness, divided by surface area of the mud cake region.

In Example 19, the subject matter of Example 18 further includes providing an estimated mud cake resistivity as an input to the solution operation, wherein the estimated mud cake resistivity has been further adjusted based on a borehole surface temperature.

In Example 20, the subject matter of Examples 15-19 further includes providing display data representative of the mud cake to a user display; receiving user input as received user input based on the user display; and control a drilling operation based on the received user input.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method comprising:
   estimating mud cake thickness based, at least in part, on an estimated borehole diameter prior to mud cake deposition and a borehole diameter measurement after mud cake deposition;
   determining a mud cake resistivity estimate;
   generating, with an iterative inversion operation, corrected formation measurements based, at least in part, on the mud cake resistivity estimate and the estimated mud cake thickness; and
   controlling a wireline logging system based on the corrected formation measurements.

2. The method of claim 1, further comprising:
   generating a revised estimated mud cake thickness during the iterative inversion operation; and
   providing corrected borehole diameter measurements using at least the revised estimated mud cake thickness.

3. The method of claim 1, further comprising:
   adjusting the mud cake resistivity estimate based on a surface temperature measurement before mud cake deposition.

4. The method of claim 1, further comprising:
   generating an effective mud cake resistance that is proportional to a product of the estimated mud cake thickness and the mud cake resistivity estimate,
   wherein generating the corrected formation measurements with the iterative inversion operation is also based, at least in part, on the effective mud cake resistance.

5. The method of claim 1 further comprising:
   disposing a measurement tool in a formation; and
   measuring, by the measurement tool, measurements for the formation,
   wherein the mud cake resistivity estimate is based, at least in part, on at least one of the measurements by the measurement tool.

6. The method of claim 1, wherein the iterative inversion operation is an iterative radial inversion operation.

7. The method of claim 1, wherein generating the corrected formation measurements with the iterative inversion operation comprises determining differences between simulated tool logs and measured logs until a termination criterion for the iterative inversion operation is satisfied, wherein the corrected formation measurements are based, at least in part, on the simulated tool logs.

8. The method of claim 7 further comprising updating the formation measurements in each iteration based, at least in part, on the determined differences.

9. The method of claim 7 further comprising updating at least one of the estimated mud cake thickness and the mud cake resistivity estimate based, at least in part, the determined differences.

10. The method of claim 1, wherein the corrected formation measurements at least comprise corrected measurements of invasion resistivity Rxo, invasion diameter Dxo, and non-invaded formation resistivity $R_T$.

11. The method of claim 1 further comprising:
    disposing a measurement tool in a formation; and
    measuring, by the measurement tool, measurements for the formation, wherein an initial estimate of at least one of the corrected formation measurements is based, at least in part, on at least one of the measurements by the measurement tool.

12. A logging system comprising:
    a measurement tool; and
    a processing unit; and
    a processor-readable medium having instructions stored thereon executable by the processing unit to cause the logging system to,
      estimate mud cake thickness based, at least in part, on an estimated borehole diameter prior to mud cake deposition and a borehole diameter measurement after mud cake deposition to provide an estimated mud cake thickness;
      determine a mud cake resistivity estimate;
      generate, with an iterative inversion operation, corrected formation measurements based, at least in part, on the estimated mud cake thickness and the mud cake resistivity estimate; and
      control a wireline logging system based on the corrected formation measurements.

13. The logging system of claim 12, wherein the measurement tool is galvanic.

14. The logging system of claim 13, wherein the measurement tool includes a laterolog.

15. The logging system of claim 12, further including a caliper system that obtains the borehole diameter measurement.

16. The logging system of claim 12, wherein the instructions to generate the corrected formation measurements comprise instructions executable by the processing unit to cause the logging system to determine differences between simulated tool logs and measured logs until a termination criterion for the iterative inversion operation is satisfied, wherein the corrected formation measurements are based, at least in part, on the simulated tool logs and the measured logs are generated with measurements from the measurement tool.

17. The logging system of claim 16, wherein the instructions to generate the corrected formation measurements further comprise instructions executable by the processing unit to cause the logging system to update the formation measurements in each iteration based, at least in part, on the determined differences.

18. The logging system of claim 16, wherein the instructions to generate the corrected formation measurements further comprise instructions executable by the processing unit to cause the logging system to update at least one of the estimated mud cake thickness and the mud cake resistivity estimate based, at least in part, the determined differences.

19. The logging system of claim 12, wherein the corrected formation measurements at least comprise corrected measurements of invasion resistivity Rxo, invasion diameter Dxo, and non-invaded formation resistivity $R_T$.

20. A non-transitory processor-readable medium including instructions that, when executed on a processor, cause the processor to perform operations including:
  estimating mud cake thickness based, at least in part, on an estimated borehole diameter prior to mud cake deposition and a borehole diameter measurements after mud cake deposition;
  determining a mud cake resistivity;
  generating, with an iterative inversion operation, corrected formation measurements based, at least in part, on the mud cake resistivity estimate and the estimated mud cake thickness; and
  controlling a wireline logging system based on the corrected formation measurements.

21. The non-transitory processor-readable medium of claim 20, further comprising instructions executable by the processor to perform operations comprising determining an effective mud cake resistance R as the mud cake resistivity estimate times estimated mud cake thickness, divided by surface area of the mud cake region.

22. The non-transitory processor-readable medium of claim 21, having further instructions stored thereon, which, when performed by the processor, cause the processor to perform operations comprising:
  providing the estimated mud cake resistivity as an input to the iterative inversion operation.

23. The non-transitory processor-readable medium of claim 20, wherein generating the corrected formation measurements with the iterative inversion operation comprises determining differences between simulated tool logs and measured logs until a termination criterion for the iterative inversion operation is satisfied, wherein the corrected formation measurements are based, at least in part, on the simulated tool logs.

* * * * *